United States Patent Office 3,393,694
Patented July 23, 1968

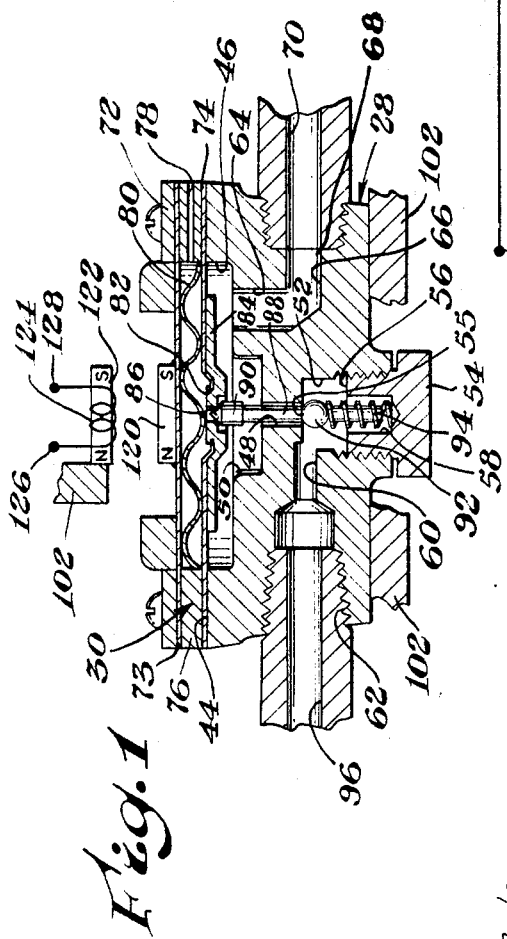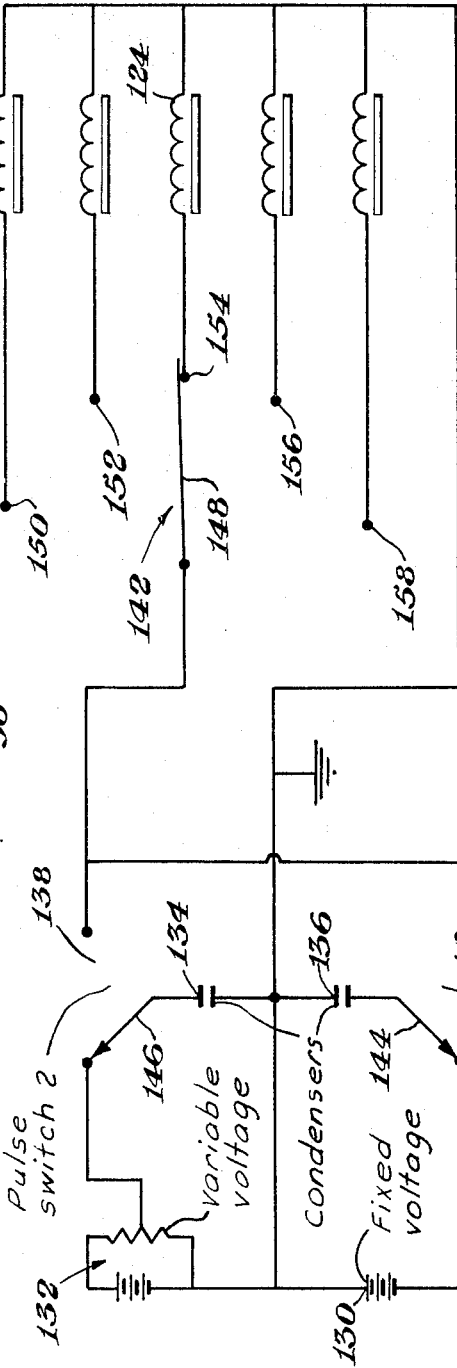
INVENTORS
Alfred V. Baker
Porter Hart
BY Earl D. Ayers
AGENT

3,393,694
CONTROL DEVICE
Alfred V. Baker, Freeport, and Porter Hart, Lake Jackson, Tex., assignors to The Dow Chemical Company, Midland, Mich., a corporation of Delaware
Filed May 28, 1964, Ser. No. 370,987
5 Claims. (Cl. 137—116.5)

This invention relates to apparatus for actuating process control or other elements by means of intermittant signals in accordance with a desired predetermined functional relationship.

A number of approaches have been made towards controlling chemical or other manufacturing processes from a single centralized or remote location with respect to valves or other elements being controlled.

Pneumatic control exercised from a central location is one approach.

In another approach a continuous electrical signal is passed through a coil coupled to a soft iron magnetizable element to provide a magnetic field of predetermined strength which is then coupled directly to a controlled element or indirectly to the control element through a pneumatic controller device.

So far as is known, the prior art systems or methods for actuating process control elements in accordance with a predetermined functional relationship suffer from one or more of the following problems:

(a) The speed at which actuating control is asserted or changed is too slow either for the process being controlled or for efficient and/or effective coupling to the means for determining the desired predetermined functional relationship;

(b) The apparatus is unduly complex with respect to the work the apparatus accomplishes;

(c) The apparatus is rather expensive with respect to the work being accomplished;

(d) The reliability of the apparatus is not as good as could be desired, resulting in substantially less than optimum process control;

(e) The stability of the control system, e.g. wherein the day to day application of the same control signal results in the same degree of valve control, for example, may be less than is desired;

(f) In event the control apparatus becomes inoperative, the degree of safety in further operation or shut down of the process being controlled is less than can be tolerated;

(g) The apparatus controls the process in discrete changes in adjustment of process equipment which are larger than can be conveniently used;

(h) Each element controlled requires for its control a continuous sampling signal from the computer or other device which calculates the degree of control required, or (i) The control system isn't compatible for use with existing actuating devices.

Accordingly, a principal object of this invention is to provide improved apparatus for actuating process control or other elements.

Another object of this invention is to provide an improved, more economical apparatus for actuating process control or other elements.

A further object of this invention is to provide an improved, more reliable apparatus for actuating process control or other elements on a continuous basis from control signals applied on a discontinuous basis.

An additional object of this invention is to provide an improved apparatus for actuating control or other elements with a great degree of resolution.

In accordance with this invention there is provided valve or control element positioning apparatus comprising a magnetic-pneumatic relay whose pneumatic output is coupled to a further pneumatic control device. A permanent magnet whose degree of magnetism is settable to pre-determined levels on suitable pulsing of an electromagnetic winding of a permanent magnet which is mechanically coupled to a diaphragm of the magnetic-pneumatic relay.

An increase or decrease in the degree of repulsion between the two magnets causes corresponding movement of a diaphragm and valve assembly until the pneumatic pressure on the side of the diaphragm opposite the magnets balances the counter force on the diaphragm.

The invention, as well as additional objects and advantages thereof, will best be understood when the following detailed description is read in connection with the accompanying drawings, in which:

FIGURE 1 is a diagrammatical view of control element relay apparatus in accordance with this invention, and FIGURE 2 is a schematic diagram of a simplified pulsing circuit for use in pulsing the electromagnetic element in FIGURE 1.

Referring to FIGURE 1, the relay comprises an upper flanged section 72 which clamps a diaphragm-vent assembly, indicated generally by the numeral 30, to a lower section, indicated generally by the numeral 28.

The lower section 28 has a generally frustoconically shaped outer configuration with its base 44 facing the diaphragm-vent section 30. The base 44 has a large diamter counter-bore 46. A central bore 48 extends axially through the section 28 from end to end. The bore 48 has a counter-bore 50 at its base end and a counter bore 52 at its other end. The counter-bore 52 is threaded and receives a plug 54 whose end 56 has a bore 58 therein.

A valve seat 55 is disposed at the junction of the bore 48 and counter-bore 52.

A bore 60 having a threaded counter-bore 62 extends from the side wall of the section 28 to the counter-bore 52.

A bore 64 extends downwardly from the counter-bore 46 and communicates with a bore 66 which extends inwardly from the side wall of the section 28. The outer end 68 of the bore 66 is counter-bored and threaded to receive a tube 70.

The diaphragm-vent section 30 comprises a pair of thin diaphragm discs 73, 74 having substantially the same diameter as the bases of the section 28. The discs 73, 74 are separated at their peripheral parts by an annular gasket member 76 which is generally not compressed during its usage in this device. A bore 78 extends laterally through the annular gasket member 76 and constitutes a vent.

The space between the diaphragm discs 73, 74 which is surrounded by the peripheral gasket member 76 has a generally corrugated material 80 therein, contacting both discs 73, 74.

The disc 74 has a central bore 82 extending therethrough. A stiffener element 84 is bonded to the disc 74 and has a valve seat 86 which communicates with the bore 82. The valve seat 86, valve seat 55 and bore 58 are axially aligned.

A valve stem 88 which has a valve 90 at one end and a second valve 92 intermediate its ends is disposed within the section 28 with its valve 90 seated against the valve seat 86, the valve 92 seated against the valve seat 55 and its lower end disposed within the bore 58 of the plug 54. A spring 94 surrounds the lower end part of the valve stem 88, bearing against the plug 54 and valve 92 and urging the valve stem upwardly.

An air (gas) supply line 96 is coupled to the counter-bore 62.

The lower section 28 is mechanically coupled to a frame (shown only in part) 102.

A permanent magnet 120 is mechanically coupled to the diaphragm disc 73 near the center thereof.

A second permanent magnet 122 having an electromagnetic coil 124 surrounding it is mechanically coupled to the frame 102 substantially parallel to the magnet 120 and close spaced with respect to the magnet 120 whereby their magnetic fields interact to a substantial degree.

The coil 124 is energized by applying current to it through the leads 126, 128. A suitable circuit for applying current to the coil 124 is shown in FIGURE 2.

The circuit of FIGURE 2 includes a source of fixed voltage 130, indicated as a battery, for example, a source of variable voltage 132, a pair of condensers 134, 136, a pair of single pole, double throw switches 138, 140, and a single pole, multiple throw switch 142.

The voltage source 130 has its positive terminal connected to a ground and its negative terminal connected to one throw of the single pole, double throw switch 140. The condenser 136 is connected between ground and the movable contact 144 of the switch 140.

The variable voltage source 132 has its negative terminal connected to ground and its positive terminal connected to one of the throws of the switch 138. The condenser 134 is connected between ground and the moving contact 146 of the switch 138. The second throw of each of the switches 138, 140 are connected together and to the movable contact 148 of the single pole multiple throw switch 142.

Each of the contacts or throws 150, 152, 154, 156, 158, for example, are connected to one end of a coil (such as the coil 124, for example) which is coupled to a permanent magnet (such as magnet 122, for example) of one of the magnetic-pneumatic relay devices of this invention. The other end of each coil is connected to a common ground.

In operation, using the circuit of FIGURE 2, with the moving contact 148 of the switch 142 set to the throw 154, to which the coil 124 (see FIGURE 1 also) is coupled, the condenser 136 is charged by moving the contact 144 to couple the condenser 136 across the source of fixed voltage 130. The contact 144 is then connected to the other throw of the switch 140, discharging the condenser 136 across the switch 142, through the coil 124, to ground.

The variable voltage source 132 is then set to the potential which will induce the requisite degree of magnetization of the magnet 122 when the coil 124 is pulsed in the opposite direction. (The variable voltage source and the fixed voltage source are polarized opposite with respect to ground.)

With the contact 146 of the switch 138 coupled to the now pre-set variable voltage source 132, the condenser 134 is charged to the level set by the voltage source 132.

The contact 146 on switch 138 is then coupled to the other throw of that switch, discharging the condenser 134 through the switch 142 and coil 124 to ground (with the condenser 136 disconnected from the discharge circuit). This last pulse, oppositely polarized with respect to the pulse which occurred when the condenser 136 was discharged, produces a degree of magnetization in the magnet 122 which is proportional to the level, output or amount of control to be accomplished by the magnetic-pneumatic relay in FIGURE 1.

The magnet 122 may be magnetized with respect to the magnet 120 so that they repel each other, are neutral to each other, or attract each other; the resulting force exerted on the diaphragm disc 73 by the magnets 122, 120 being a function of the level and polarity of magnetization induced in the magnet 122 (assuming the magnetization of magnet 120 remains constant).

If the force caused by the interaction of the magnets 122, 120 is a repelling force, that force would tend to push downwardly the disc 73 and, through the corrugated material 80, the disc 74, moving the diaphragm assembly away from the magnet 122 of the relay.

In the relay the increase in downward pressure due to the increased repulsion of the magnets 120, 122 forces the diaphragm assembly 30 and valve element 88 downward, opening the valve 92 and allowing air (or other gas) from the supply line 96 to pass through the bore 48 and out through the line 70 to a utilization device (not shown) until the pressure equalizes on both sides of the diaphragm assembly.

A decreasing in the repulsing force between the two magnets 120, 122 results in the upward movement of the diaphragm assembly, opening the valve 90 with respect to its seat 86 and permitting gas to escape from the line 70 through the vent 74 until the forces on the diaphragm assembly 30 balance and close the valve 90.

It may be seen from the above that the present invention provides an effective means whereby pneumatic control of a process control element may be maintained at a pre-determined level in response to electrical impulses applied to the device without the inertial delays inherent in long pneumatic lines. It should be realized that the pulsing of the coil 124 from the condenser charged with a fixed voltage is followed rapidly by the pulsing from the condenser which is charged by the variable voltage whose valve is a function of the positional control to be maintained by the device. Because of the rapidity at which the second pulse follows the first or reset pulse, the inertia of the device prevents any change in the positional stability when the reset pulse is applied.

The circuitry of FIGURE 2 is simplified in form, and in practice more sophisticated pulsing means would be provided. It may readily be seen, however, that as the contact 148 of the switch 142 is moved, other coils may be pulsed either in sequence or on a random basis.

What is claimed is:

1. Magnetic-pneumatic control apparatus comprising a body member having upper and lower ends and side walls, said member having a bore extending axially therethrough, said bore being counter-bored at its upper end and at its lower end, a diaphragm assembly, said diaphragm assembly having a centrally disposed bore therein which communicates from one side of said diaphragm to the exterior of said diaphragm assembly, said diaphragm assembly being coupled across the upper end of said body member in a gas tight manner with said centrally disposed bore opening towards the axially extending bore in said body member, a valve assembly, said valve assembly extending along the axially extending bore in said body member, said valve assembly including a pair of valves which are coupled to one another, the first of said valves being adapted to seat against said centrally disposed bore and the second of said valves being adapted to seat against the wall of said axially extending bore in said body member at the inner end of the counter bore at the lower end of the body member, means closing said counter bore at the lower end of the body member, means for urging said valve assembly towards said upper end of said body member, a pneumatic input line, said input line being coupled to said axially extending bore in said body member between said second valve and said lower end of said body member, a pneumatic output line, said pneumatic output line being coupled to said axially extending bore in said body member between where said second valve seats and the upper end of said axially extending bore, and electromagnetic element including a pneumatic magnet type core and a first permanent magnetic element, one of said magnetic elements being mechanically coupled to said diaphragm whereby movement of said element moves said diaphragm, and the other magnetic element being disposed in fixed relationship with respect thereto, an electromagnetic winding, said winding surrounding said electromagnetic element, and means whereby said coil is pulsed at predetermined intervals to change the level of magnetization of said electromagnetic element whereby the magnetic fields of the two magnetic elements interact and said diaphragm is moved a distance which is a function of the degree of magnetism induced in said permanent magnet type core of said electro-magnetic element.

2. Apparatus in accordance with claim 1, wherein said diaphragm assembly comprises a pair of flexible discs separated at their periphery by a solid annulus and separated at their central parts by an air permeable force transmitting material, said annulus having bore extending from its inner to its outer periphery, and a centrally disposed bore extending through one of said discs.

3. Apparatus in accordance with claim 1, wherein electromagnetic element and said permanent magnetic element comprise bar magnets.

4. Apparatus in accordance with claim 1, wherein said valve assembly is a rod-like member having a first valve at one end and a second valve disposed intermediate of its ends.

5. Apparatus in accordance with claim 1, wherein said means for urging said valve assembly is a spring.

References Cited

UNITED STATES PATENTS

| | | | |
|---|---|---|---|
| 2,390,985 | 11/1945 | Boyer | 251—65 X |
| 2,501,957 | 3/1950 | Moore | 137—85 |
| 2,635,618 | 4/1953 | Moore | 137—85 |
| 2,972,465 | 2/1961 | Ray | 251—65 X |
| 3,021,858 | 2/1962 | Kirk | 137—85 |
| 3,071,147 | 1/1963 | Dudzinski | 137—116.5 |
| 2,777,993 | 1/1957 | Braden | 251—65 |

WILLIAM F. O'DEA, *Primary Examiner.*

H. M. COHN, *Assistant Examiner.*